(12) United States Patent
Friedman et al.

(10) Patent No.: US 8,527,880 B2
(45) Date of Patent: *Sep. 3, 2013

(54) METHOD AND APPARATUS FOR VIRTUAL EDITING OF MULTIMEDIA PRESENTATIONS

(75) Inventors: Glen Friedman, Los Angeles, CA (US); Dan Kikinis, Saratoga, CA (US)

(73) Assignee: JLB Ventures LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/311,655

(22) Filed: Dec. 6, 2011

(65) Prior Publication Data
US 2012/0114308 A1    May 10, 2012

Related U.S. Application Data

(63) Continuation of application No. 09/997,713, filed on Nov. 29, 2001, now Pat. No. 8,078,967.

(60) Provisional application No. 60/250,978, filed on Dec. 1, 2000.

(51) Int. Cl.
*G06F 3/00* (2006.01)
*G06F 17/30* (2006.01)

(52) U.S. Cl.
USPC ........... 715/730; 715/719; 715/721; 715/723; 725/51; 707/805; 707/781; 707/705

(58) Field of Classification Search
USPC ................ 715/716, 717, 719, 720, 721, 723, 715/730, 731, 732, 200, 205, 230, 255; 725/38, 725/44, 46–49, 51, 61; 707/805, 781, 705, 707/752
See application file for complete search history.

(56) References Cited

U.S. PATENT DOCUMENTS

| | | | |
|---|---|---|---|
| 5,414,773 A | 5/1995 | Handelman |
| 5,479,268 A | 12/1995 | Young et al. |
| 5,526,034 A | 6/1996 | Hoarty et al. |
| 5,532,754 A | 7/1996 | Young et al. |
| 5,550,578 A | 8/1996 | Hoarty et al. |
| 5,737,028 A | 4/1998 | Bertram et al. |
| 5,751,282 A | 5/1998 | Girard et al. |
| 5,818,441 A | 10/1998 | Throckmorton et al. |
| 5,841,563 A | 11/1998 | Effenberger |
| 5,884,256 A | 3/1999 | Bennett et al. |

(Continued)

FOREIGN PATENT DOCUMENTS

WO    00/01149 A1    1/2000

*Primary Examiner* — Xiomar L Bautista
(74) *Attorney, Agent, or Firm* — Banner & Witcoff, Ltd.

(57) ABSTRACT

A method and apparatus for viewing desired portions of a multimedia presentation. Desired portions of a multimedia presentation are determined. In one embodiment, an editor may determine which portions of the presentation are desired. Alternatively, or additionally, specified criteria may be applied to the presentation to determine the desired portions. An annotation file is then created based upon the determined desired portions of the multimedia presentation. The annotation file contains pointers corresponding to the desired portions of the multimedia presentation. Annotation management software may be use the annotation file to cause a display device to display only desired portions of the presentation. The annotation file may be applied to a broadcast presentation or a recorded program file. In one embodiment the annotation file may contain information related to the desired portions of the multimedia presentation and/or the remainder of the multimedia presentation.

21 Claims, 3 Drawing Sheets

(56) References Cited

U.S. PATENT DOCUMENTS

| | | |
|---|---|---|
| 5,900,915 A | 5/1999 | Morrison |
| 5,907,322 A | 5/1999 | Kelly et al. |
| 5,926,168 A | 7/1999 | Fan |
| 5,956,456 A | 9/1999 | Bang et al. |
| 5,973,679 A | 10/1999 | Abbott et al. |
| 5,999,167 A | 12/1999 | Marsh et al. |
| 6,029,195 A | 2/2000 | Herz |
| 6,034,678 A | 3/2000 | Hoarty et al. |
| 6,064,380 A | 5/2000 | Swenson et al. |
| 6,075,575 A | 6/2000 | Schein et al. |
| 6,100,883 A | 8/2000 | Hoarty |
| 6,167,188 A | 12/2000 | Young et al. |
| 6,205,485 B1 | 3/2001 | Kikinis |
| 6,205,582 B1 | 3/2001 | Hoarty |
| 6,233,389 B1 | 5/2001 | Barton et al. |
| 6,271,831 B1 | 8/2001 | Escobosa et al. |
| 6,366,296 B1 | 4/2002 | Boreczky et al. |
| 6,546,405 B2 | 4/2003 | Gupta et al. |
| 6,654,030 B1 | 11/2003 | Hui |
| 7,111,009 B1 * | 9/2006 | Gupta et al. ............... 369/30.08 |
| 2002/0131511 A1 * | 9/2002 | Zenoni ..................... 375/240.28 |

* cited by examiner

METHOD AND APPARATUS FOR VIRTUAL EDITING OF MULTIMEDIA PRESENTATIONS

CROSS-REFERENCE TO RELATED APPLICATIONS

This application is a continuation of and claims the benefit of priority from co-pending non-provisional U.S. application Ser. No. 09/997,713, filed Nov. 29, 2001 and entitled "Method and Apparatus for Virtual Editing of Multimedia Presentations," which is related to, and claims the benefit of priority of provisional U.S. application Ser. No. 60/250,978 filed Dec. 1, 2000. Both applications are hereby incorporated by reference in their entirety.

FIELD OF THE INVENTION

This invention relates generally to multimedia presentations and more specifically to methods and apparatuses for virtually editing the same.

BACKGROUND OF THE INVENTION

In most multimedia presentations available today there is at least some content that a viewer would prefer was not presented. A viewer may wish to avoid certain portions of a presentation for many reasons. For example, a viewer may wish to avoid portions of a movie containing violence or profanity. A viewer may wish to avoid presentation of politically or religiously objectionable portions of a news broadcast, or socially objectionable portions of a music video, for example. Or a viewer may simply wish to avoid portions of a multimedia presentation that are boring or uninteresting to the viewer. For example, many viewers of broadcast sporting events, such as football and baseball games, don't have time to watch the entire event at the exact time it is broadcast. In such cases, the viewer may wish to save time by viewing only the portions of interest in a broadcast, (i.e., action highlights, such as home run being hit or a football scoring drive or a brilliant defensive play).

Currently viewers have no way of separating such interesting portions of a presentation from the presentation without first viewing the complete presentation. In the case of sporting events, viewers may rely on sports summary shows for highlight replays, where a broadcaster edits the sports event and typically shows only a few seconds of each action sequence. Such edited presentation are often not sufficient to fully enjoy and appreciate the action of the event. In the case of the multimedia presentations, for example, news programs, concerts, etc., viewers may have no way of viewing only specified portions of a presentation.

Viewers may record multimedia presentations such as sporting events, news reports, concerts, or other programs in their entirely for presentation at a later time. While this allows viewers to avoid unwanted portions of a presentation, the viewer must also work through, at the least fast-forwarding through, all the uninteresting portions of the presentation.

SUMMARY OF THE INVENTION

A method and apparatus for viewing desired portions of a multimedia presentation is disclosed. Desired portions of a multimedia presentation are determined. An annotation file is then on file contains pointers corresponding to the desired portions of the multimedia presentation. When the multimedia presentation is viewing, the annotation file may be used to cause a viewing device to present only the desired portions of the multimedia presentation.

Other features and advantages of the present invention will be apparent from the accompanying drawings, and from the detailed description, that follows below.

BRIEF DESCRIPTION OF THE DRAWING

The present invention is illustrated by way of example, and not limitation, by the figures of the accompanying drawings in which like references indicate similar elements and in which.

DETAILED DESCRIPTION

An embodiment of the method of the present invention allows a viewer of a multimedia presentation to view only desired portions of a presentation and to avoid undesired portions. In one embodiment an annotation file is created containing identification pointers that identify desired portion of a presentation. Annotation management software may use the identification pointers to cause a display device to display only desired portions of the presentation.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
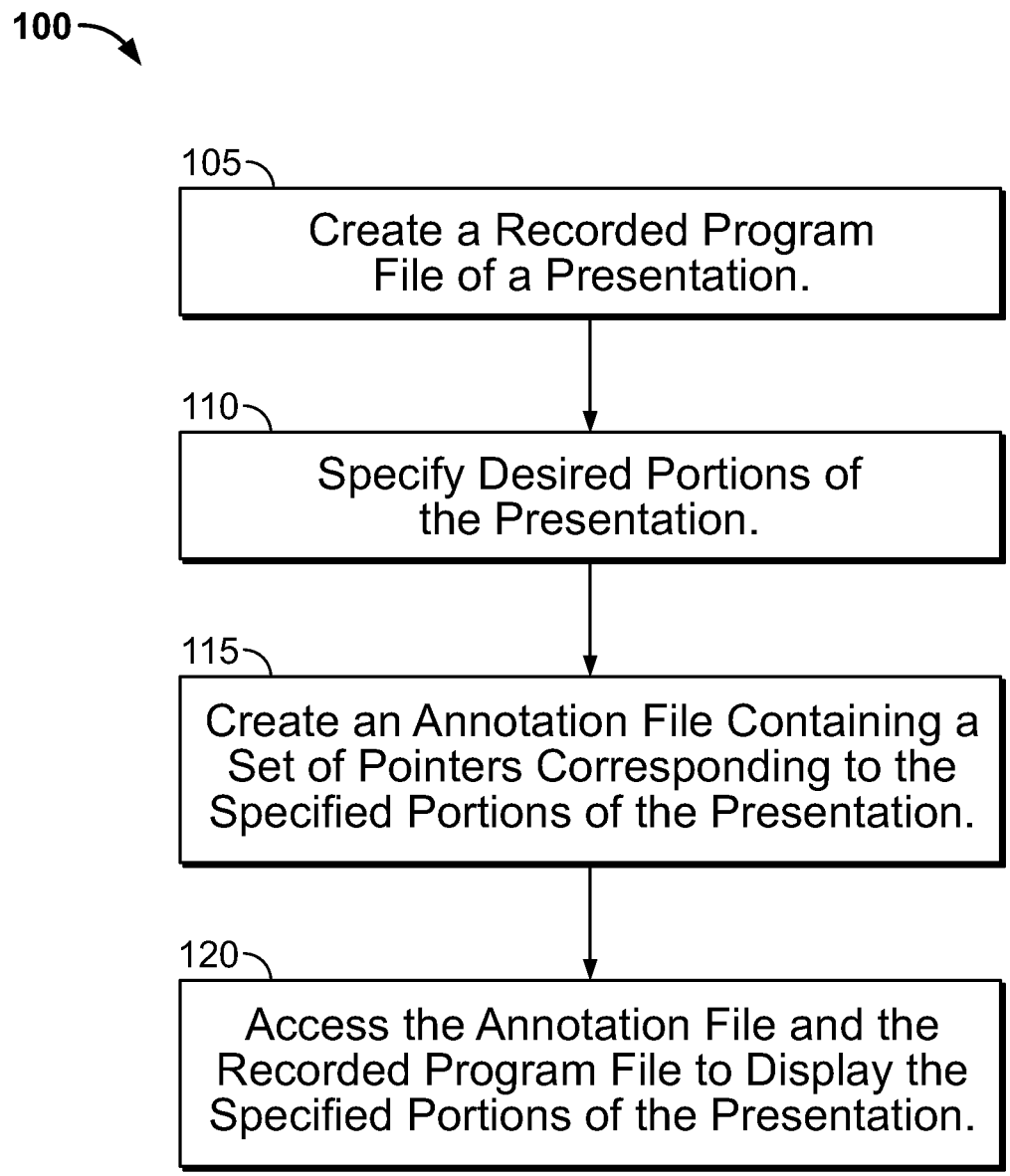
FIG. 1 is a process flow diagram in accordance with one embodiment of the presentation invention.

FIG. 1 is a process flow diagram in accordance with one embodiment of the present invention. The process 100, shown in FIG. 1, begins with operation 105 in which a recorded program file of a presentation is created. A recorded program file may be created for any type of multimedia presentation or may be created from a live event such as a broadcast football game. A recorded program file may be created on a viewer's set-top box and stored on the set-top box hard drive.

At operation 110 desired portions of the presentation are specified. The specification operation may be effected in any number of ways and based upon many different criterion and combinations thereof. For example, an editor may view an hours long sporting event and may personally determine the most interesting 15 minutes of the presentation. Alternatively, or in addition, predetermined criteria may be applied. For example, a routine determination that any unrelated aspects of a sports presentation, such as intermission entertainment, are not desired may be implemented. The specification of desired portions may be made based upon individual preferences provided by the viewer. For example, a viewer may determine that only portions of a news program relating to international events are desired. Many different parameters may be used by themselves or in combination to allow such specification. This may include but is not limited to cities, clubs, sports genres, closed caption, activities, score indications, audio recognition, video recognition, text, Internet data, other interactive television data, etc.

In one embodiment the specification operation for a given presentation may be accomplished by a person deemed knowledgeable in the area to which the presentation pertains. For example, a sport star may specify the desired portions of a sports presentation.

At operation 115 an annotation file is created with pointers set corresponding to the specified portions of the presentation. The pointers may be implemented as pairs to indicate a desired portion of the presentation. The annotation file may contain additional information such as a header to identify the program file or presentation to which the annotation file pertains.

In one embodiment, the annotation file may also contain information about the specified portions of the presentation or the remaining portions of the presentation. For example, the annotation file may present information indicating the time length of unspecified portions or a synopsis of the unspecified portions. Alternatively, or in addition, the annotation file may present information describing a specified portion prior to the specified portion being displayed. For example, if the specified portion of a baseball game includes a batter hitting a home run, the annotation file may provide the viewer with such information as the batter's name, the inning, the number of outs, the score, and the batter's previous performance (e.g., two strike outs which may have occurred in non-specified portions of the presentation). Such information may be presented prior to, or concurrent with, the specified portion of the presentation. In some cases, this may also include multiple parallel events, recorded at approximately the same time.

At operation 120 the annotation file and the recorded program file are then accessed by a display device so that only the specified portions of the presentation are displayed. For example, the viewer's set-top box may contain software that controls how the recorded program file is presented. Alternatively, the viewer may subscribe to a service that controls the viewer's display device in real time.

The operation of creating an annotation file and/or the operation of accessing the annotation file and the recorded program file in accordance with the present invention may be implemented by hardware and/or software contained within the viewer's set-top box. For example, a set-top box may include one or more processors that can execute code or instructions stored within a machine-readable medium that may also be included within the set-top box.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals.

Annotation files may be available separately from the presentations to which they pertain. For example, a viewer may obtain a DVD video movie and subsequently create or purchase an annotation file pertaining to the movie. An individual viewer may complete some or all of the specification operation. For example, a viewer may determine that only non-violent portions of the movie are desired. The viewer may then create an annotation file that specifies only non-violent portions of the movie.

An annotation file, in accordance with one embodiment of the present invention, may be produced by the broadcaster of the multimedia presentation. Annotation files may be broadcast or e-mailed to the viewer in real time or after the presentation. Annotation files may be created as an event is being broadcast. For example a sportscaster could push a button when he judges that the sporting event he is broadcasting has become interesting and release the button when the interesting portion is complete. The sportscaster's actions could then be converted into software pointers of an annotation file. The annotation file could be used to affect the broadcast in real time or used by a viewer subsequently.

Figure 2:
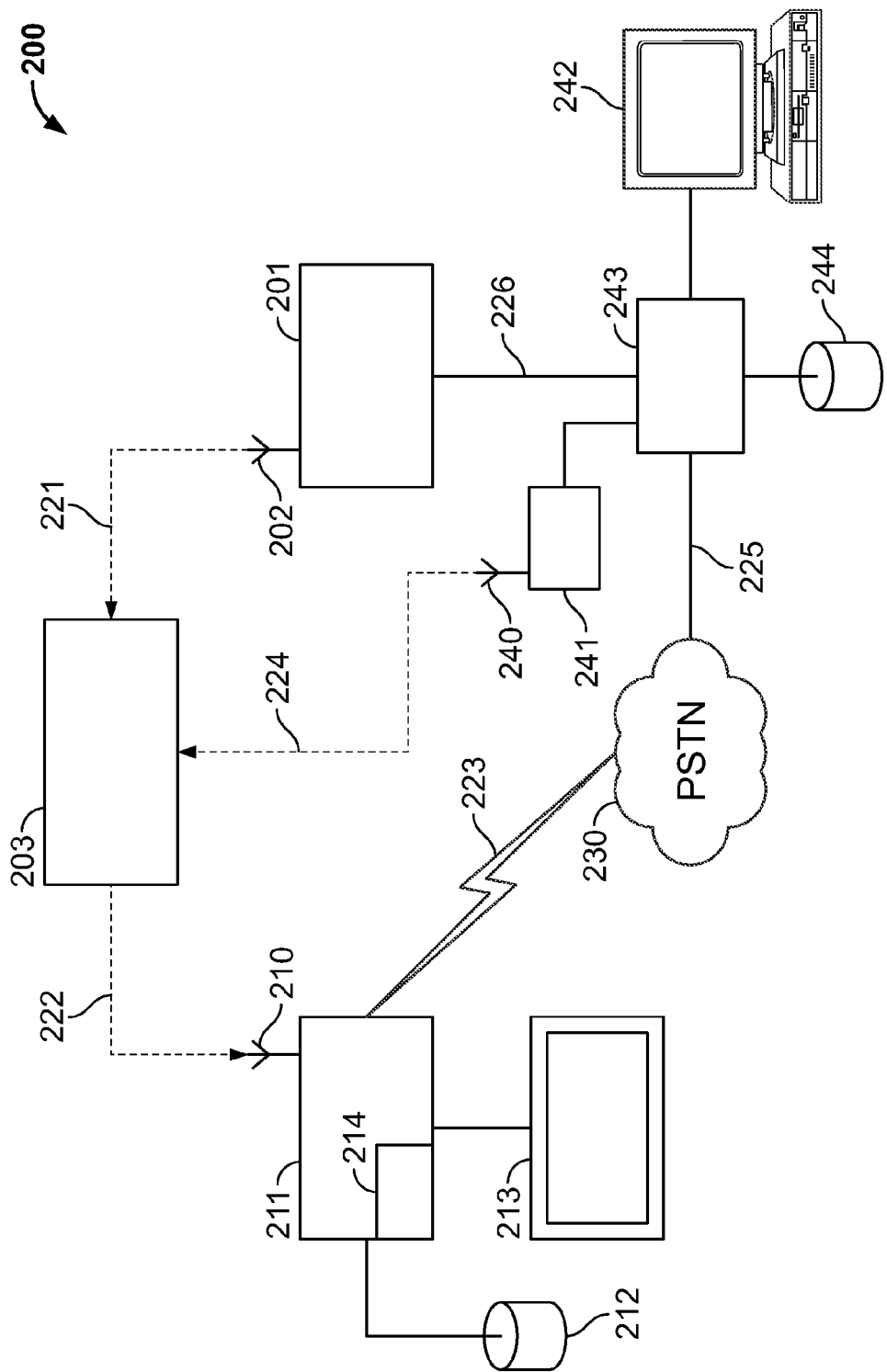
FIG. 2 is a system block diagram of a broadcast system in accordance with one embodiment of the presentation.

FIG. 2 describes in detail how an embodiment of the present invention may be applied to a broadcast presentation. However, as noted above the invention is not restricted to broadcast events and may be applied to a multimedia presentation of any format. FIG. 2 is a system block diagram of a broadcast system in accordance with one embodiment of the present invention. Those skilled in the art will recognize that the invention is not limited to embodiments illustrated by FIG. 2. For example, the satellite broadcast system may be replaced with any of various terrestrial broadcast systems, including but not limited to systems such as analog or digital cable, digital subscriber line (DSL), aerial, wireless cable, fiber, local multi-channel distribution systems (LMDS), etc., all of which are well-known in the art.

The broadcast system 200, shown in FIG. 2, includes a head end 201 having a satellite dish 202. Head end 201 transmits a presentation via a signal 221 from satellite dish 202 to satellite 203. Satellite 203 transmits the presentation via a signal 222 to a viewer's satellite receiver dish 210, which is connected to a set-top box 211.

Set-top box 211 contains a hard disk 212 that the viewer may use to record the presentation as a recorded program file. The set-top box 211 also contains annotation management software 214 in accordance with the present invention.

The viewer may typically view on a television 213 a live event or a recorded event played from hard disk 212 through set-top box 211. The set-top box 211 may also have a back-channel connection, for example, via satellite, cable network, or public switched telephone network (PSTN) 230, through telephone connection 223, typically sharing the viewer's home phone.

The back-channel connection may also be established through connection 225 to a server 243, which may, for example, receive the same broadcast as the viewer via a satellite dish 240 and a set-top box 241. The broadcast presentation may be recorded on a hard disk 244 connected to server 243. A workstation 242, connected to the server 243, may be used by an editor, not shown, to view the broadcast. The editor may then specify desired portions of the presentation and create an annotation file including pointers corresponding to the desired portions of the presentation.

The annotation file may then be downloaded from the server 243, through a back-channel connection, to Set-top box 211.

In one embodiment, the program provider or broadcaster may operate server 243. In such cases, a link 226 may allow a direct connection via a LAN between server 243 and head end 201. The annotation happens in server 243 under use of workstation 242. In one embodiment the annotation file may then be transmitted back over link 226 and broadcast over a data broadcast facility, for example, embedded in an MPEG file. In an alternative embodiment, the annotation file may be transmitted via separate dedicated data channels, to be received by set-top box 211. For example, the annotation file may be sent via link 225 and PSTN, Internet, or other transmission links to set-top box 211.

In an alternative embodiment, the server 243 is operated independently. Presentations may be received using satellite 203 and link 224, and annotated in server 243, by workstation 242. The annotation file may then be sent via link 225 and PSTN, Internet, or other transmission link to set-top box 211. In one embodiment, the annotation content may be sent over link 226, and broadcast over a data broadcast facility, for example, embedded in an MPEG file. In an alternative embodiment the annotation file may be transmitted via separate dedicated data channels, to be received by set-top box 211 under a separate data broadcast agreement.

Figure 3:
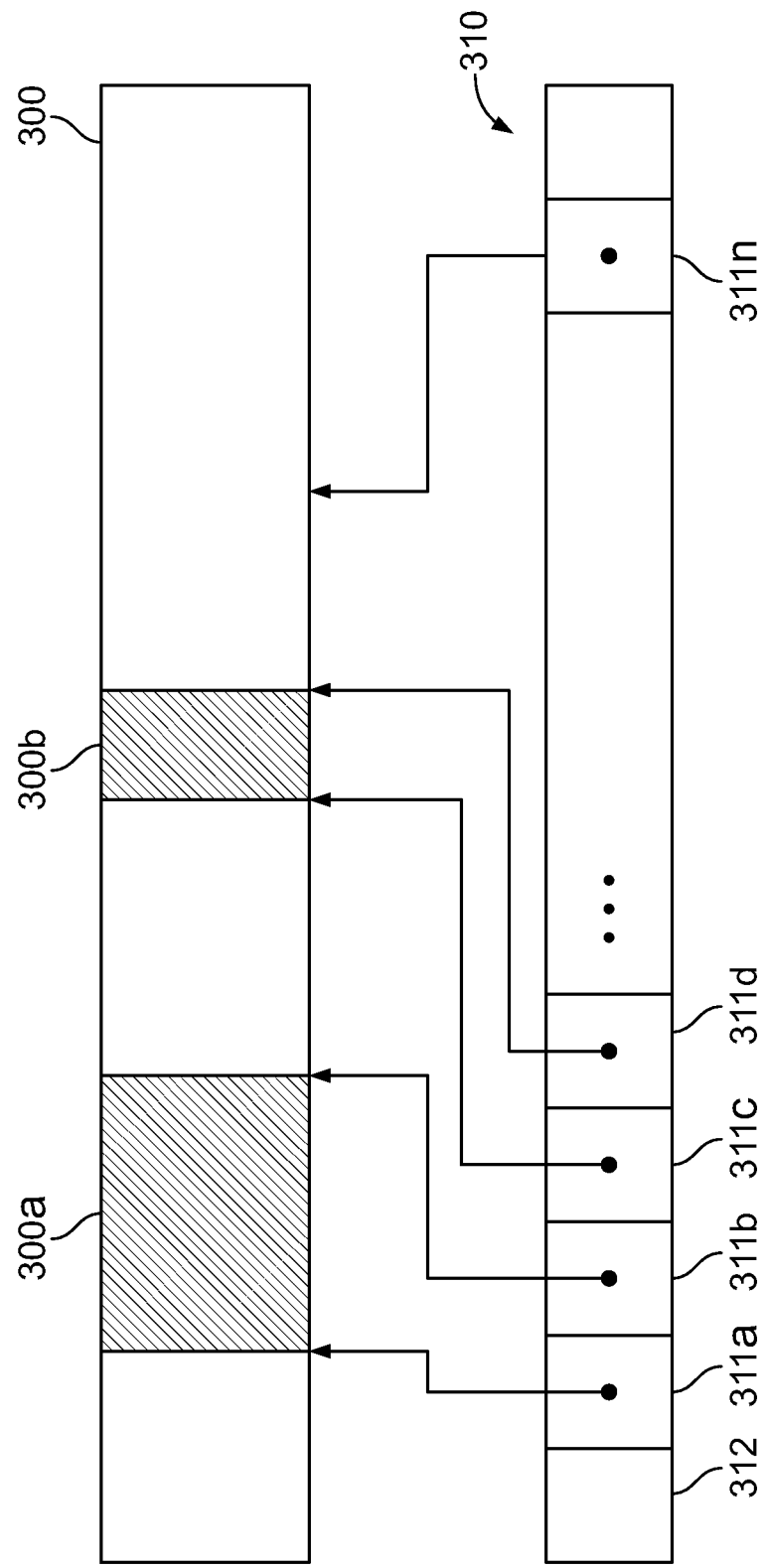
FIG. 3 illustrates an exemplary recorded program file and a corresponding annotation file in accordance with one embodiment of the present invention.

FIG. 3 illustrates an exemplary recorded program file and a corresponding annotation file in accordance with one embodiment of the present invention. The recorded program file 300, shown in FIG. 3, may be, for example, an MPEG2 file. Alternatively, recorded program file 300 may be in any type of video or audio recording file format known in the art. Portions of recorded program file 300, 300*a* and 300*b*, indicate desired portions of a presentation. The corresponding annotation file 310, shown in FIG. 3, includes a series of pointers, 311*a* through 311*n*, which correspond to desired portions of a presentation in program file 300. Some of the pointers may be paired pointers, such as 311*a* and 311*b*, that can mark a spot and scope of a segment of interest, as do similarly paired pointers 311*c* and 311*d* and other similar pairs. A single pointer 311*n* points to a specific singularity or event, for example, the beginning of a particular activity.

In one embodiment, annotation file 310 may include an ID header 312 that allows the annotation file to identify the recorded program file to which it pertains.

When the viewer plays the annotation file and recorded program file, the annotation management software 214 reads the annotation file and causes a display device to display only the desired portions of the multimedia presentation (i.e., portions 300*a* and portion 300*b* of program file 300). Portions of program file 300 not specified as desired are not presented. For example, the annotation management software may cause a display device to skip the unspecified portions of program file 300. Therefore, the viewer may be presented only the portions determined by the annotation file. A user interface (not shown) may also be included. The user interface may use dedicated or programmable buttons to navigate. In one embodiment, the user interface may be controlled by, and or viewed on, a computer or internet appliance using standard PC-type controls. Furthermore, commands may be displayed on the screen and called upon with pointer devices or navigational keys. In an alternative embodiment, the whole event is recorded and other scenes may be viewed by using normal recorded media navigation, rather than special keys. The same are used within the selected scenes. This also applies for cases of partial recordings.

Many variations may be made without departing from the spirit of the invention, which allows viewers to view only desired portions of a presentation. Annotation files specifying desired portions of multimedia presentations may be offered as a subscription service separately from the actual programming or the annotation files may be combined with the programming as an enhancement of the broadcasting service. Alternatively, annotation files may be created by individual viewers or independent producers.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   identifying a plurality of desired portions of a content item;
   automatically creating, by a computing device having at least one processor, annotations for the content item, wherein automatically creating the annotations includes:
   storing a first identifier corresponding to a first desired portion of the plurality of desired portions and a second identifier corresponding to a second desired portion of the plurality of desired portions in the annotations, wherein the first desired portion and the second desired portion are separated in the content item by an intervening portion, and
   storing displayable content information describing a non-identified portion of the content item; and
   generating, by the computing device, a display of the displayable content information describing the non-identified portion of the content item without displaying the non-identified portion.

2. The method of claim 1 further comprising:
   creating a recorded program file of the content item;
   playing the content item using a viewing system; and
   accessing the annotations such that, of the content item, only the plurality of desired portions are displayed by the viewing system.

3. The method of claim 1, wherein the identification of the plurality of desired portions includes applying a set of criteria to the content item.

4. The method of claim 1, wherein the set of criteria includes at least one preference of a viewer.

5. The method of claim 1, wherein the annotations are stored in an annotation file, the annotation file further storing: information related to the plurality of desired portions of the multimedia presentation.

6. A method comprising:
   transmitting, by a computing device having at least one processor, a content item to a first location;
   identifying a plurality of desired portions of the content item at a location remote from said first location;
   creating one or more annotations for the content item, the one or more annotations including a pointer corresponding to a desired portion of the plurality of desired portions and displayable content information describing a non-identified portion of the content item, wherein the displayable content information is different from the content item; and
   transmitting, from the location remote from said first location, the one or more annotations to another device, including the pointer and the displayable content information, wherein the one or more annotations are configured to cause the other device to generate a display of the displayable content information along with one or more of the plurality of desired portions.

7. The method of claim 6, wherein the one or more annotations are transmitted subsequent to content item being provided at a specified time.

8. The method of claim 6, wherein creating the one or more annotations is performed by applying a set of one or more criteria to portions of the content item.

9. The method of claim 8, wherein the set of one or more criteria is user-defined.

10. The method of claim 6, wherein the one or more annotations include a pair of pointers, one pointer identifying a beginning of the desired portion and the other pointer identifying an end of the desired portion.

11. An apparatus comprising:
   a processor; and
   non-transitory memory storing computer readable instructions that, when executed, cause the apparatus to:

identify a plurality of desired portions of a content item;
create annotations for the content item, wherein automatically creating the annotations includes:
storing a first identifier corresponding to a first desired portion of the plurality of desired portions and a second identifier corresponding to a second desired portion of the plurality of desired portions in the annotations, wherein the first desired portion and the second desired portion are separated in the content item by an intervening portion, and
storing displayable content information describing a non-identified portion of the content item; and
generate a display of the displayable content information describing the non-identified portion of the content item without displaying the non-identified portion.

12. The apparatus of claim 11, wherein the computer readable instructions, when executed, further cause the apparatus to:
create a recorded program file of the content item;
render the content item using a viewing system; and
access the annotations such that, of the content item, only the plurality of desired portions are displayed by the viewing system.

13. The apparatus of claim 11, wherein the identification of the plurality of desired portions includes applying a set of criteria to the content item.

14. The apparatus of claim 11, wherein the set of criteria includes at least one preference of a viewer.

15. The apparatus of claim 11, wherein the annotations are stored in an annotation file, the annotation file further storing: information related to the plurality of desired portions of the multimedia presentation.

16. The apparatus of claim 11, wherein the apparatus is a set-top box.

17. An apparatus comprising:
a processor; and
non-transitory memory storing computer readable instructions that, when executed, cause the apparatus to:
transmit a content item to a first location;
identify a plurality of desired portions of the content item at a location remote from said first location;
create one or more annotations for the content item, the one or more annotations including a pointer corresponding to a desired portion of the plurality of desired portions and displayable content information describing a non-identified portion of the content item, wherein the displayable content information is different from the content item; and
transmit, from the location remote from said first location, the one or more annotations to another device, including the pointer and the displayable content information, wherein the one or more annotations are configured to cause the other device to generate a display of the displayable content information along with one or more of the plurality of desired portions.

18. The apparatus of claim 17, wherein the one or more annotations are transmitted subsequent to the content item being provided at a specified time.

19. The apparatus of claim 17, wherein creating the one or more annotations is performed by applying a set of one or more criteria to portions of the content item.

20. The apparatus of claim 19, wherein the set of one or more criteria is user-defined.

21. The apparatus of claim 17, wherein the one or more annotations include a pair of pointers, one pointer identifying a beginning of the desired portion and the other pointer identifying an end of the desired portion.

* * * * *